United States Patent
Lee et al.

(10) Patent No.: US 8,968,571 B2
(45) Date of Patent: Mar. 3, 2015

(54) METHOD AND DEVICE FOR CONVERTING HORIZONTAL TANKS INTO GAS FLOTATION SEPARATORS

(75) Inventors: Douglas W. Lee, Calgary (CA); Nicholas Owens, Calgary (CA)

(73) Assignee: Exterran Holdings, Inc., Houston, TX (US)

( * ) Notice: Subject to any disclaimer, the term of this patent is extended or adjusted under 35 U.S.C. 154(b) by 1339 days.

(21) Appl. No.: 12/676,324

(22) PCT Filed: Sep. 4, 2007

(86) PCT No.: PCT/IB2007/004350
§ 371 (c)(1),
(2), (4) Date: Jun. 2, 2011

(87) PCT Pub. No.: WO2009/030977
PCT Pub. Date: Mar. 12, 2009

(65) Prior Publication Data
US 2011/0297620 A1    Dec. 8, 2011

(51) Int. Cl.
*C02F 1/24* (2006.01)
*B01D 17/035* (2006.01)
(Continued)

(52) U.S. Cl.
CPC ............... *B03D 1/24* (2013.01); *B03D 1/1456* (2013.01); *B01D 17/0205* (2013.01);
(Continued)

(58) Field of Classification Search
CPC .... C02F 1/24; B01D 17/035; B01D 2221/08; B03D 1/247; B03D 1/1412; B03D 1/1456
USPC ............. 210/221.2, 242.1, 194, 95, 175, 703, 210/322
See application file for complete search history.

(56) References Cited

U.S. PATENT DOCUMENTS

| | | | |
|---|---|---|---|
| 2007/0114183 A1 | 5/2007 | Lee et al. | |
| 2008/0017582 A1* | 1/2008 | Stacy et al. | 210/703 |
| 2009/0152204 A1* | 6/2009 | Chantrel et al. | 210/718 |

FOREIGN PATENT DOCUMENTS

| | | |
|---|---|---|
| CA | 2302110 A1 | 9/2001 |
| JP | 10-174964 A   * | 6/1998 |

*Primary Examiner* — Thomas M Lithgow

(57) ABSTRACT

A gas flotation separator for use in horizontal tanks, such as those used for oil storage on board Floating Production Storage and Off-loading (FPSO) vessels, includes dividing the tank into a plurality of chambers operating in series. Prior to entering each chamber, the contaminated aqueous phase is mixed with a stream containing gas bubbles to aid in flocculation and flotation of the immiscible phase contaminant. The gas bubble recycle stream can be generated by injecting a controlled rate of a pressurized gas into a liquid stream of the clean produced water in a process external to the tank or by induction of a gas phase internal to the tank. The mixture flows into the first chamber and impinges on an angled inlet water weir. A portion of the immiscible phase and the gas phase rises to the top of the chamber while the remaining immiscible contaminants flow downward with the aqueous phase to the bottom of the chamber. The aqueous phase makes a 180° turn upward by entering a plurality of parallel flow conduits formed into the wall of the baffle that separates the each series chamber. In each parallel duct a second gas bubble stream is injected to further aid in flocculation and flotation of the immiscible contaminants. The aqueous phase remixes at the top of the second chamber where it impinges on a second angled weir. This process is repeated in each series chamber until the last chamber where the cleaned water is pumped out of the chamber via a liquid pump. Varying the rate of water removal there from controls the water level in last chamber. The flocculated and floating oil contaminant can be removed by either 1) periodic skimming into an over-flow weir by raising the water level in the chamber, or 2) a continuously rotating paddle or brush object that lifts or carries the floating oil layer away from the water surface and transfers it to a collector system.

24 Claims, 3 Drawing Sheets

(51) Int. Cl.
*B03D 1/24* (2006.01)
*B03D 1/14* (2006.01)
*B01D 17/02* (2006.01)
*B63B 35/32* (2006.01)
*B03D 1/02* (2006.01)
*C02F 1/40* (2006.01)
*C02F 103/00* (2006.01)

(52) U.S. Cl.
CPC ............... *B63B 35/32* (2013.01); *C02F 1/24* (2013.01); *C02F 1/40* (2013.01); *C02F 2103/008* (2013.01); *B03D 1/1431* (2013.01); *B03D 1/028* (2013.01); *B03D 1/1406* (2013.01); *B03D 1/1412* (2013.01); *B03D 1/1468* (2013.01); *B03D 1/1493* (2013.01)
USPC ............ 210/703; 210/95; 210/175; 210/194; 210/221.1; 210/242.1; 210/322

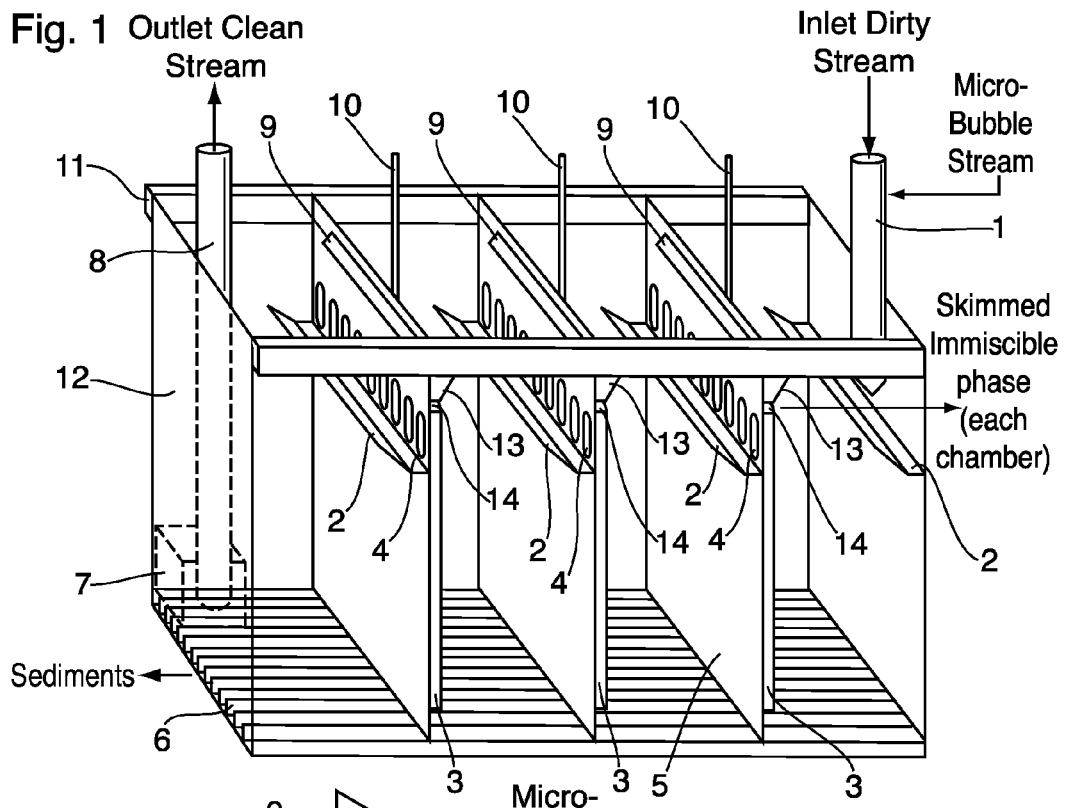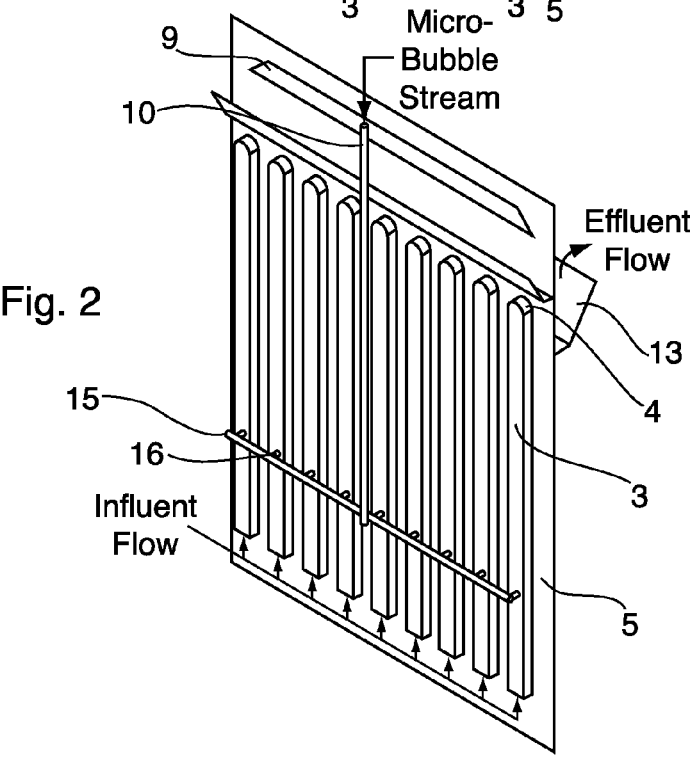

METHOD AND DEVICE FOR CONVERTING HORIZONTAL TANKS INTO GAS FLOTATION SEPARATORS

TECHNICAL FIELD

This application is a §371 U.S. national phase of International Application No. PCT/IB2007/004350 filed on Sept.4, 2007, the entire contents of which are incorporated by reference herein.

This device and method generally relate to the field of liquid purification or separation between a primary aqueous phase and an immiscible contaminant phase by means of flotation affected by the addition of chemical flocculating agents and a buoyancy gas. Although the various embodiments of the present invention are applicable to other liquid separation applications, the invention will be demonstrated in terms of the common application of purifying water extracted during oil production in the petroleum industry. More specifically, it will be demonstrated in terms of the subject matter for which the invention was initially developed, i.e., converting the oil storage tanks in the hulls of Floating Production, Storage and Off-loading (FPSO) ships into produced water treatment cells for removal of trace oil and solid contaminants.

In petroleum production, water accompanying the produced oil, termed "produced water," frequently contains small oil droplets held in suspension and fine inorganic particulates. Various methods and apparatus have been proposed to enable the separation of the oil from the produced water, usually employing some form of flotation system. One separation technology employed in the petroleum industry is the use of API and gravity separation tanks, such as a "skim tank". This technology is relatively simple and inexpensive, depending on the different densities of oil and water to enable gravity separation. Contaminated water is held in a vessel for a predetermined period of time, during which time the oil separates from the water and rises and collects at the vessel surface, allowing for skimming off of the oil. Parameters such as retention time, oil properties and inlet stream characteristics can be controlled to enhance separation, and tank dimensions are also of crucial importance. While such separators can be quite effective in removing larger oil droplets, however, they are significantly less effective in removing oil droplets of less than 20 microns (even if chemical treatments are added) and require substantial retention times.

Another well-known technology is the corrugated plate interceptor (CPI). In CPI vessels, corrugated plates are used to amplify the density differences by providing an inclined plate with a longer fluid travel path. With an inclined plate, individual oil droplets are presented with a shorter travel path to reach adjacent oil droplets, creating larger coalesced oil droplets that rise more quickly to the fluid surface. This allows for vessels with a much smaller footprint than with traditional gravity separation vessels, but it has the same limitation of being generally ineffective in removing oil droplets of less than 50 microns. In addition, chemical usage is increased and CPI vessels usually cope poorly with flow surges.

Induced gas flotation (IGF) vessels are also known in the industry, where gas is induced into the contaminated water (by means usually including eductors, sparging tubes and paddles) to more rapidly float the oil droplets out of the produced water. The oily froth is then skimmed off, sometimes by a baffle system. While IGF is one of the most prevalent technologies presently in use, it is still limited in terms of the oil droplet size that can be removed, and chemical treatment is therefore required. Also, the technology generally cannot be efficiently employed in retrofit situations.

Induced static flotation (ISF) technology is also known in the industry. This is another induced gas system, although it uses a different method of gas bubble generation than with IGF methods. In IGF systems, the bubbles are generated by mechanical means, while in ISF systems the bubbles are created by hydraulic methods. ISF vessels are usually separated into chambers, with gas introduction in each of the chambers, and ISF methods can be employed with a pressurized vessel. One limitation of ISF systems is that they have difficulty coping with oil concentrations above 300 ppm. In addition, such systems do not adequately address flow rate fluctuations, and retrofit capability is generally absent.

The present invention relates to wastewater treatment and particularly to an improved separator apparatus for separating oil from influent produced water, such as the wastewater generated from oil and gas well drilling and production operations. More particularly, the present invention relates to an improved flotation separator retrofit directed at tanks such as those in the hull of a Floating Production, Storage and Off-loading vessels (FPSO's). FPSO's are a type of floating tank system used by the off-shore petroleum industry designed to take all of the oil or gas produced from a nearby platform(s), process it, and store it until the oil or gas can be offloaded onto waiting tankers, or sent through a pipeline. FPSO's carry out some form of oil separation process obviating the need for such platform-based or land-based facilities or expensive long-distance pipelines from the oil well the treatment facility.

BACKGROUND ART

FPSO's typically must perform the following functions: 1) primary separation of the well fluids (gases, solids, non-aqueous oil phase, aqueous phase), 2) secondary treatment of the separated phases for discharge or re-injection, and 3) storage of the produced oil until off-loading. Since the oil phase is the most valuable commodity, most of the FPSO's available hull space is dedicated to primary separation and storage of the produced oil. However, due to discharge permit restrictions for the aqueous phase, some of the FPSO's precious space must be allocated to water treatment equipment. Current FPSO's utilize the same Induced Gas Flotation vessels of either the vertical or horizontal configuration commonly found on fixed platforms and land-based treatment facilities. This equipment is designed to flocculate and float tiny oil droplets dispersed within the aqueous phase using gas bubbles and the addition of flocculating chemicals. The most common produced water treatment system designs are somewhat limiting for the FPSO application due to the space and weight limitations. Furthermore, the swaying nature of a floating ship makes conventional oil skimming and water level controls problematic.

What has been needed in the industry is a high-performance gas flotation separator system that can be incorporated into the existing hull tanks of an FPSO at a reasonable cost with limited deck space usage, and minimum height requirements.

What has also been needed in the industry is a high-performance gas flotation separator system that can be incorporated in a number of existing tank configurations (i.e., horizontal rectangular or cylindrical) with minimal internal modifications required and relatively simple construction. When incorporated into a used shipping container, for example, the method and device of the present invention would provide a highly cost-effective solution to portable gas flotation systems for use in oil/water spill clean-ups, plant capacity expansions, and temporary use systems.

DISCLOSURE OF INVENTION

The inventors present a novel method and device for high-performance gas flotation treatment for a contaminated aqueous stream that can be easily incorporated into any horizontal cylindrical or rectangular vessel as for example the oil storage tanks in the hulls of FPSO's. The design presents a configuration that is readily adaptable to other existing tank and vessel structures and provides such high-performance water treatment for a given inlet water volume as to allow the same effective treatment at a much lower spatial requirement. When this method is incorporated into the hull tanks of an FPSO, for example, the benefits of surge capacity, dampening of wave motion, and increased flexibility of oil skimming methods can be easily accommodated with little or no major internal modifications.

The method and device of the present invention can be used for the treatment of fluids other than produced water and for removal of contaminants other than produced oil and solids as would be obvious to one skilled in the art of gas, liquid, solid phase separations.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein:

FIG. 1 presents a three-dimensional view of a typical 4-chamber design of the present invention;

FIG. 2 presents a three-dimensional side view of the chamber baffle 5 of FIG. 1, as looking from the inlet water side. Further detail of the riser ducts 3 and other aspects of this baffle are demonstrated in this view.

BEST MODE FOR CARRYING OUT THE INVENTION

Figure 3:
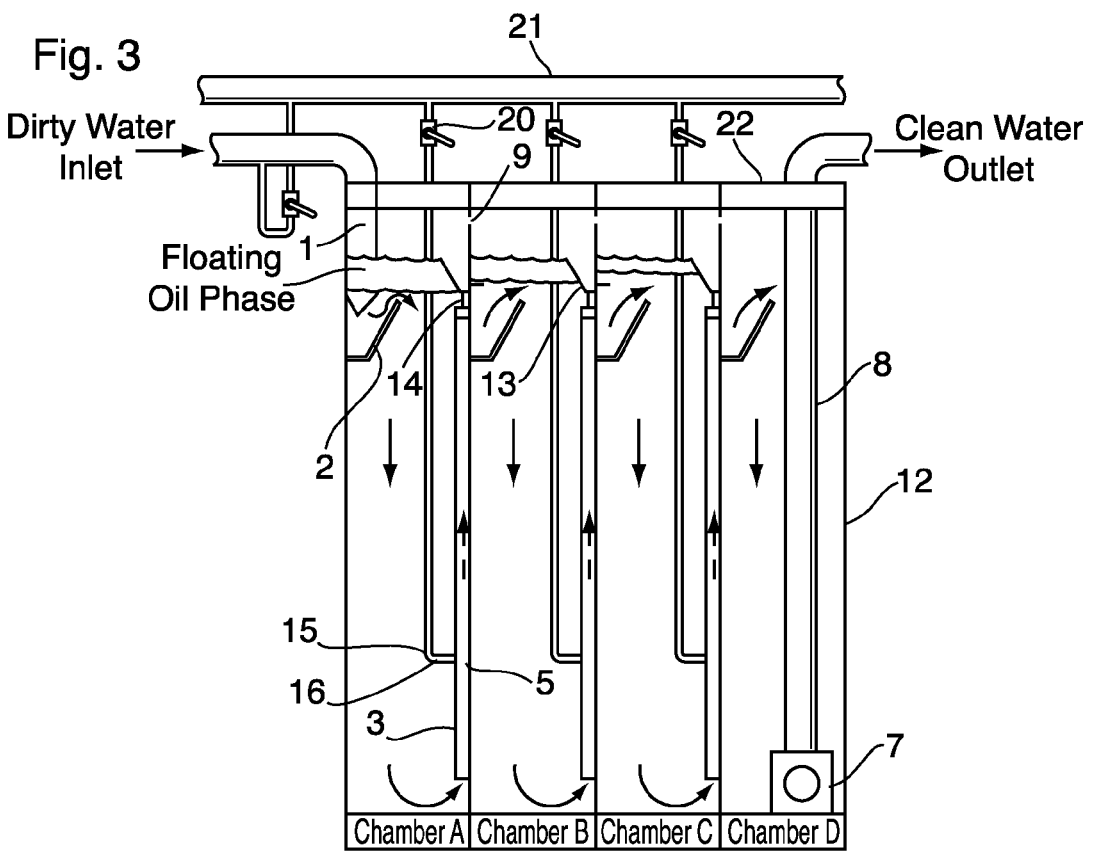
FIG. 3 presents an elevation cut-away view of three chambers of the present invention showing various features and flow dynamics.

FIG. 1 shows the basic elements of a treatment cell of the present invention. Produced water or other aqueous stream contaminated with solids and an immiscible phase is first mixed with a portion of a recycle stream containing a dispersion of gas bubbles and enters the treatment cell through a pipe 1. FIG. 1 shows this pipe 1 as a vertical conduit discharging through a 45° cell into the first chamber of the cell. The recycle stream containing gas bubbles can be generated by reference to methods described U.S. Pat. No. 7,159,854 (Lee, et al.) U.S. Pat. No. 7,108,250 (Lee, et al.) of the present inventors whose specifications are incorporated herein by reference. The inventors generate this gas bubble stream by taking a portion of the clean aqueous phase exiting the treatment system and dispersing a controlled amount of a pressurized gas, such as natural gas or air. The gas phase partially dissolves into the aqueous phase such that when the pressure is suddenly reduced, the dissolved gas phase re-emerges from the liquid phase in the form of small bubbles of size in the range of 1-20 microns, as termed herein "gas bubbles." The purpose of these gas bubbles is to accelerate the flocculation and flotation of the immiscible contaminants by providing a non-aqueous surface for attachment of the immiscible phase dispersion and enhanced vertical migration of the immiscible contaminants due to the bubble natural buoyancy in the liquid phase. In one embodiment, the dispersed gas bubbles are created by the use of jet eductors that draw in a stream of gas from the headspace above the liquid level in the tank as a pressurized liquid stream flows through the eductor. The amount of gas dispersed within the liquid stream may be controlled by regulating the rate of gas entering the eductor or by regulating the rate of the inducing liquid stream flowing through the eductor.

In continued reference to FIG. 2., the incoming dirty stream and gas bubble stream mixture enters the first chamber of the treatment cell and impinges on a diverting baffle 2 shown attached to the left-most wall of the first chamber. This diverting baffle 2 extends horizontally from the chamber-dividing wall 5 a first short distance then rises up at an angle of between 30° to 60° to the horizontal a second short distance. The purpose of this diverting baffle is to direct the incoming stream upward to impart a vertical direction to the gas bubbles and to promote contact between the immiscible phase dispersion and any accumulated quantities of the immiscible phase that are floating on top of the aqueous phase inside the chamber. When treating produced water for oil and solids contaminants, the immiscible oil phase will quickly accumulate in the first chamber and gradually decrease in subsequent chambers. By diverting the incoming dirty stream upward into the accumulated immiscible phase, sub-turbulent mixing of the aqueous and immiscible phases which enhances the capture and removal of gas dispersions of oil at a faster rate than would occur simply by utilizing flocculating chemical additives, natural buoyancy forces, and residence time.

In continued reference to FIG. 1, the aqueous phase flows downward through the chamber while the gas bubbles and immiscible phase contaminants rise upward. Solids, if present, tend to fall to the bottom of the chamber into the a series of channels 6 which provide areas where the solids can accumulate and avoid possible lifting turbulence from the moving aqueous stream above. The aqueous phase exits the first chamber through a plurality of vertical riser conduits 3. As will be described in more detail on FIG. 2, these parallel riser conduits provide both a preferential route for the aqueous phase into the second chamber of the treatment cell, but also provide a controlled environment where a second gas bubble stream can be injected to further enhance flocculation and removal of the immiscible contaminants. The aqueous phase enters each parallel riser conduit at a downwardly projecting opening at 3. As the aqueous phase flows up the each riser conduit, it is mixed with a second gas bubble stream entering through a transport conduit 10. The aqueous phase and gas bubble stream exit each riser conduit through an opening 4 that projects into the second chamber of the treating cell. As described previously for the first chamber, the aqueous phase exiting each riser conduit undergoes the same sequence of re-direction upward by a diverting baffle 2 followed by sub-turbulent mixing with the accumulated immiscible phase, then downward flow through the center portion of the chamber, followed by a 180° turn up through a second set of riser conduits. For most produced water treating applications, three series treatment chambers are adequate followed by a quiet chamber formed by a solid dividing wall 12 at the end where the water is extracted through a submersible pump 7 and a vertical riser pipe 8 before exiting the treatment cell for discharge, re-injection into a subsurface formation, or final polishing by fixed-media filtration. Alternatively, an external pump having a suction line extending down into the bottom of the quiet chamber may remove the water. The liquid level of the treatment cell can be controlled by any number of well-know means, such as placement of a level-sensing element in the quiet chamber with a feed-forward control signal to a modulating flow control element on the discharge of the pumping element 7.

FIG. 2 shows a side view of a typical chamber-dividing wall 5 where the vertical riser conduits 3 and the secondary gas bubble dispersing stream injecting elements 15 and 16 are more clearly shown than in the FIG. 1 view. In the preferred embodiment, each riser conduit is of generally rectangular shape and is sized to provide a cross-sectional area sufficient to provide sub-turbulent flow as defined by a water stream Reynolds Number less than approximately 4,000. In continued reference to FIG. 1 and FIG. 2, the headspace of each chamber is in gas-phase communication through cut-outs 9 in the upper most section of the chamber dividing walls 5 which allow the gas-phase emerging from the liquid to be extracted through a common conduit that can be located essentially anywhere within the top of the treatment cell vessel. The gas bubble stream is injected through a central feed conduit 10 connected on one end to the gas bubble stream source and on the other end to the lateral distribution header 15, which extends across the plurality of riser conduits. A small extension conduit 16 directs a portion of each gas bubble stream to each riser conduit from the lateral distribution header 15. The balancing of flow across each of the parallel riser conduits is achieved by symmetrical layout of the conduits and over-sizing of the lateral conduit 15 relative to the extension conduit 16 so that head-pressure loss across each side of the lateral header 15 is minimized.

FIG. 3 shows a side view of the preferred embodiment of this invention comprised of three settling chambers (Chambers A, B, and C) and one quiescent chamber, Chamber D. The contaminated aqueous phase enters the pipe on the left side of FIG. 3 where it is mixed with a gas bubble stream from the gas bubble supply header 21. The rate at which the gas bubble stream is added can be modulated by adjustment of a suitable control element 20 shown as a manually adjustable globe valve. The contaminated aqueous phase and first gas bubble stream mix flows in through the inlet line 1 and into the inlet weir 2. As the aqueous phase flows downward, gas bubbles and oily contaminants float upward and accumulate in a floating oil phase. Any oil accumulated in this area can be periodically skimmed off by raising the aqueous level in each chamber. This can be achieved by reducing flow out from the pump 7 while the inlet water rate remains roughly the same. The excess water accumulates within each chamber and lifts the floating oil phase over the edge of the oil collection weir 13. The skimmed oil collects in the trough area formed by the weir and the side wall 5 and can be drained off periodically or mechanically removed by any number of means known to those skilled in the art. The water phase travels downward to the inlet of the riser conduits 3. As the water enters each of these parallel conduits, a second gas bubble stream is mixed through the central feed conduit 10 connected on one end to the gas bubble stream source and on the other end to the lateral distribution header 15, which extends across the plurality of riser conduits. The mixture rises up through the conduits and discharges into the inlet weir of the next chamber. This sequence is repeated in the subsequent chamber C. The cleaned aqueous phase flows over the inlet weir of Chamber D and then is drawn downward by the extraction of water through the pumping means 7 shown in FIG. 3 as a submerged pump.

Although the embodiment of FIG. 3, shows three settling chambers and one quiescent chamber, it is to be understood that the optimum number of chambers for removal of a given contaminant from an aqueous phase is dependent on many factors such as the buoyancy of the flocculated or immiscible contaminant and the inlet concentration. An analysis of the primary variables affecting the sizing and number of chambers for optimum contaminant removal may be found in LEE, D. W., BATEMAN, W. and OWENS, N. Efficiency of Oil/Water Separation Controlled by Gas Bubble Size and Fluid Dynamics within the Separation Vessel [online], January 2007 [retrieved on 2007-07-29]. Retrieved from the Internet: <URL: http://www.glrsolutions.com/artieles/download/pws2007.pdfhttp>, which is incorporated herein by reference.

In continued reference to FIG. 3, the method presented by inventors sets out an integrated series of flow sequences for purifying the aqueous phase of an immiscible contaminant. The first step is to provide a water treatment vessel 22 comprising a plurality of treatment chambers A, B, and C, an inlet weir 2 supported within each chamber by first mounting means, and an immiscible fluid weir 13 supported within each treating chamber by second mounting means, spaced from the inlet weir 2. The vessel 22 and the chamber spacing are sized to provide sufficient residence time as per customer specifications, which total residence times are typically 10 minutes. The next step is to transmit the contaminated water from its source toward that chamber via an injection line. Contaminated water entering the vessel is usually produced water received from primary separation units such as a "Free Water Knockout" (FWKO) unit or "treater". The composition of this produced water varies considerably between sites and contents can fluctuate largely depending on the sites' operations. Typical oil and grease concentrations vary between 50 ppm and 2000 ppm, and oil properties (including density and viscosity) vary by site. Oil can be found in an emulsified form, as either a reverse emulsion or a normal emulsion, and certain clarifier chemicals may be added to aid in the flotation, on top of those chemicals that are already added to the system for normal operations. Total suspended solids and trace chemical compounds (such as sulphur and iron compounds) concentrations are also site specific. Water inlet temperature can vary from 20.degree. C. to 90.degree. C. In some methods according to the present invention, clean water could also be introduced into the vessel before injection of the contaminated water.

A bubble generation stream 21 and an injection control element 20 are provided for injection into the aqueous phase at the various points shown in the Figure. Bubble generation means may include those taught in Canadian Patent Application No. 2,460,123, mentioned above, where gas experiences shear, impact and pressure resulting in bubbles 5 to 50 microns in diameter. Smaller bubbles more effectively separate oil from water, resulting in a drier froth and low skim volume. The bubbles are then allowed to mix with the contaminated water in the injection line, forming an inlet fluid. The inlet fluid is then released into the chamber through the inlet line 1, on to, and over the inlet weir 2. Separation of water and immiscible fluid then occurs with the cleaned water being allowed to flow downwardly under force of gravity to the inlet of the plurality of riser ducts 3. The remaining mixture of immiscible fluid and gas bubbles is then allowed to float across the chamber and over the immiscible fluid weir 13, and the immiscible fluid is finally allowed to collect in a trough and flow out an immiscible fluid outlet 14. The drawing of fluid from the last chamber D results in a pressure drop that drives the system; the water flows through the system by gravity and hence there is a hydraulic gradient through each chamber, so the parallel riser pipes are preferably sized to minimize the pressure drop.

Referring again to the embodiment of FIG. 3, the vessel 22 would be sized to allow for sufficient residence time, usually between 60 and 120 minutes depending on customer specifications, but with additional volume to allow for surge capacity. To prevent short-circuiting of bubbles and oil through the system, downward velocity of fluid flow through each chamber is preferably maintained below 1.4 ft/min. In a method incorporating a vessel 22 in accordance with the embodiment of FIGS. 4 and 5, residence times are typically kept at approximately 10 minutes, with appropriate downward velocities being maintained, as would be appreciated and understood by someone skilled in the art.

Figure 4:
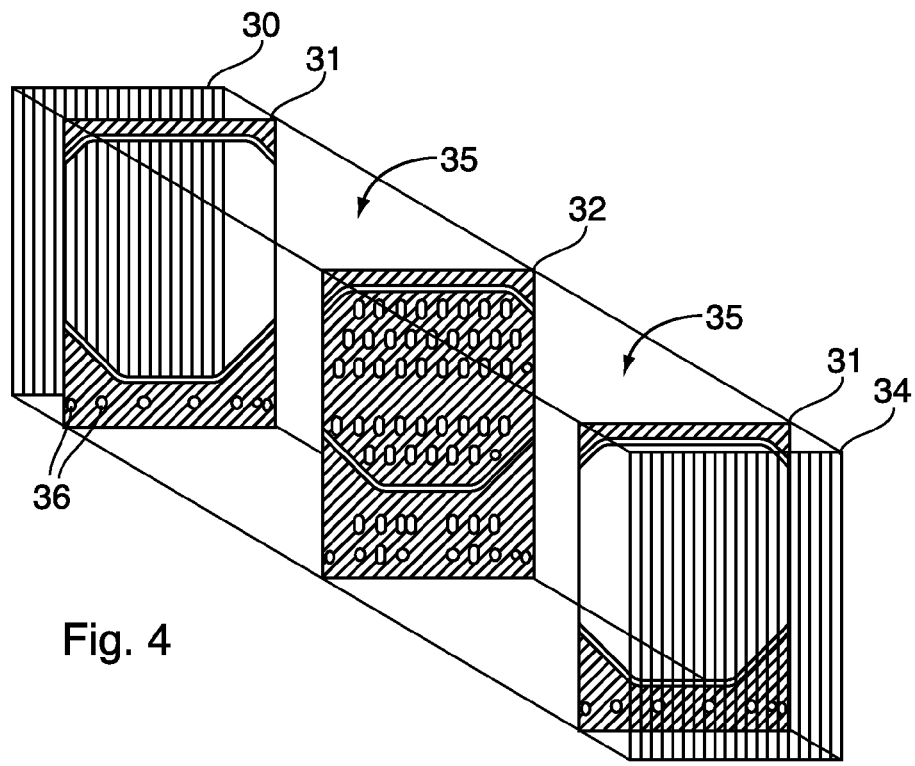
FIG. 4 presents a 3-dimensional view rectangular of an oil storage vessel common to FPSO's prior to conversion to a producer water-treating vessel according to the method of the present invention.

With reference to FIG. 4., a typical hull oil tank of an FPSO is shown prior to the addition of the inventor's preferred embodiment. When in oil or ballast water storage service, the tank is comprised of a sealed rectangular void having solid plates 30 as ends. Structural support baffles 31 are placed between the ends to maintain structural integrity of the vessel under the weight of the fluid inside and the movement of the vessel on water. Only two of these support baffles are shown in the figure. The remainder are removed and replaced with sidewalls 5 of the present invention. A special slosh-dampening center baffle 32 is installed and contains a plurality of holes therein that restrict sudden movement of the tanks fluid contents under the natural pitch and roll motion of the vessel at sea. In some FPSO hull tanks, piping and other flow conduits extend through the area, which requires that holes 36 be cut into the support baffles 31, the center baffle 32, and the side walls 5 to allow the hull tank to be converted to a flotation separator while maintaining use of existing piping and conduit systems.

Figure 5:
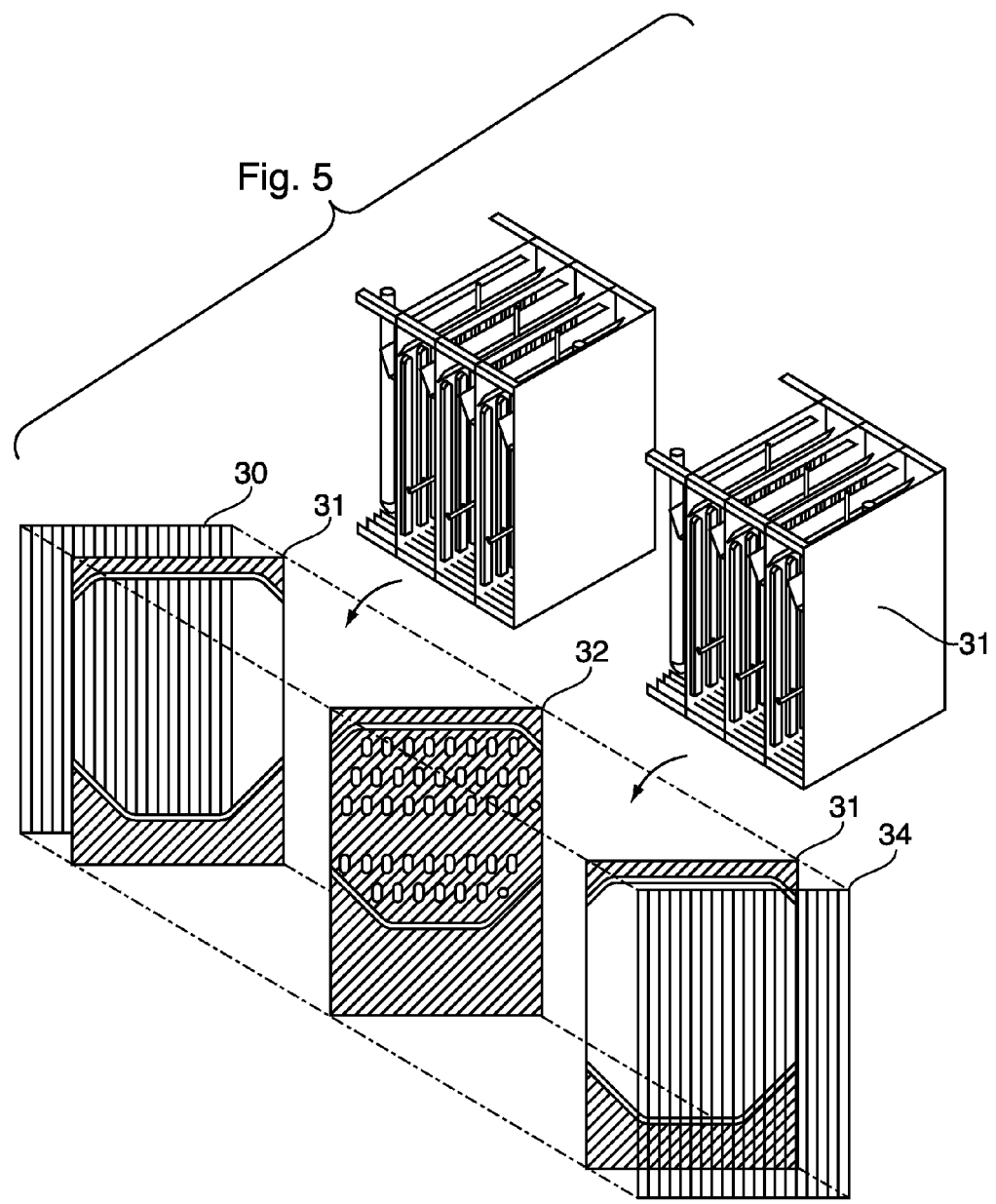
FIG. 5 presents a 3-dimensional view of an embodiment of the current invention as retrofitted or incorporated into the FPSO oil storage vessel shown in FIG. 4.

With reference to FIG. 5., the rectangular hull of the FPSO as shown in FIG. 4 is now shown with two of the four chamber section embodiments placed within the spaces between the center baffle 32. This Figure demonstrates one means for converting an FPSO hull tank to a produced water treatment cell using the method and device described herein by the inventors. It should be understood that although the applications used to describe the method and device of the inventors is converting the hull tank of an FPSO to a produced water-treating vessel, this method could be equally applied to many other rectangular tanks and in both offshore platform and land-based oil and water treating systems. Also, separation processes other than oil and water may be used that are known to be responsive to Gas Flotation processes.

While particular embodiments of the present invention have been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. A water treatment vessel for removing immiscible and solid contaminates from an aqueous phase comprised of a series of interconnecting chambers, each chamber separated from an adjacent chamber by a chamber-dividing wall, and each chamber further comprising:
   a central void providing a dynamic residence time for separation of gas, liquid and solid phases,
   an injection line in fluid communication with an inlet of the central void and for containing and transmitting the contaminated water from a source;
   a bubble generation means in fluid communication with the injection line for injecting gas bubbles into the injection line and allowing mixing in the injection line of the gas bubbles and the contaminated water to form an inlet fluid to the central void;
   an inlet weir mounted on an interior surface of a chamber-dividing wall adjacent the inlet for deflecting the inlet fluid in an upwardly direction;
   an immiscible fluid weir mounted on an interior surface of an adjacent chamber-dividing wall spaced from the inlet weir; a trough for collecting the immiscible fluid and allowing the immiscible fluid to flow out of each chamber through an immiscible fluid outlet; and
   a plurality of parallel vertical riser conduits disposed on the interior surface of the adjacent chamber-dividing wall, each vertical riser conduit having a receiving end generally at the bottom of each chamber for transporting clean water upward to an outlet end, the outlet end in fluid communication with the adjacent downstream chamber in the series, and bubble-conduit attached to each vertical riser conduit for injecting an additional stream of gas bubbles;
wherein when the inlet fluid is injected into the first chamber, passes through the inlet and over the inlet weir, the cleaned water flows downwardly toward the plurality of vertical riser conduits, and a mixture of the immiscible fluid and the gas bubbles floats up through the central void to pass over the immiscible fluid weir and down the trough to the immiscible fluid outlet.

2. The water treatment vessel of claim 1 wherein the inlet weir comprises a base portion and a peripheral wall portion, the peripheral wall portion generally angled upwardly and outwardly from the base portion, for directing the inlet fluid upwardly and away from the inlet, the injection line extending across the at least one chamber to enter the inlet weir.

3. The water treatment system of claim 1 wherein the water treatment vessel is substantially rectangular.

4. The water treatment vessel of claim 1 wherein the water treatment vessel is a pressure vessel.

5. The water treatment vessel of claim 1 wherein the water treatment vessel is incorporated into a compartment within the hull of a Floating Production, Storage and Off-loading (FPSO) ship.

6. The water treatment vessel of claim 1 wherein the immiscible fluid weir comprises a wall portion directly mounted on the interior surface of the adjacent chamber-dividing wall and generally angled upwardly and inwardly from the interior surface.

7. The water treatment vessel of claim 1 wherein the gas bubbles are micro bubbles.

8. The water treatment vessel of claim 7 wherein the microbubbles are each less than 50 microns in diameter.

9. The water treatment vessel of claim 1 further comprising recycle flow means for redirecting at least a portion of the cleaned water to the bubble generation means.

10. The water treatment vessel of claim 1 wherein the immiscible fluid is oil or bitumen.

11. The water treatment vessel of claim 9 wherein the recycle flow means are for redirecting between 25 percent and 50 percent inclusive of the cleaned water to the bubble generation means.

12. The water treatment vessel of claim 1 further comprising flow control means for maintaining volume of fluid exiting the water treatment vessel substantially equal to volume of the inlet fluid entering the water treatment vessel.

13. The water treatment vessel of claim 1 wherein the vertical riser conduits are sized to minimize pressure drop across the chambers of the water treatment vessel.

14. The water treatment vessel of claim 1 further comprising weir adjustment means to enable height adjustment of the immiscible fluid weir to minimize clean water loss.

15. The water treatment vessel of claim 14 further comprising at least one observation port in the at least one chamber to enable height adjustment of the immiscible fluid weir.

16. The water treatment vessel of claim 14 wherein the weir adjustment means comprise a threaded spindle extending through the water treatment vessel and sealed by a packing gland, rotation of the spindle causing height adjustment of the immiscible fluid weir.

17. The water treatment vessel of claim 14 wherein the immiscible fluid weir is composed of polyvinylidene fluoride.

18. The water treatment vessel of claim 1 wherein heating means is placed inside the trough to improve flowability of the immiscible fluid in the trough toward the trough outlet.

19. The water treatment vessel of claim 1 wherein the immiscible fluid outlet is in fluid communication with an immiscible fluid retention tank adjacent the water treatment vessel.

20. The water treatment vessel of claim 1 wherein the gas bubbles are composed of a gas selected from the group consisting of air, hydrocarbon gas, and nitrogen.

21. The water treatment vessel of claim 1 further comprising: a sealed outlet chamber for receiving cleaned water from the last treatment chamber; and a clean water outlet pipe extending into the sealed outlet chamber having one end projecting near the bottom of the chamber and a second end connected to a pumping means for extracting cleaned water from the outlet chamber.

22. The water treatment vessel of claim 21 wherein the pumping means is an external pump, or is internal to the sealed outlet chamber in the form of a submersible pump, drawing suction near the bottom of the chamber.

23. The water treatment vessel of claim 1 wherein the immiscible fluid weir is disposed on the interior surface of the adjacent chamber-dividing wall, substantially opposite from and generally above the inlet weir.

24. A method for removing immiscible fluid from contaminated water from a source, the method comprising the steps of:
(a) providing a water treatment vessel comprising a plurality of equally-spaced chambers, an inlet weir supported within the first chamber by first mounting means, and an immiscible fluid weir supported within the first chamber by second mounting means, spaced from the inlet weir;
(b) transmitting the contaminated water from the source to the first chamber by means of an injection line;
(c) providing bubble generation means for generating bubbles;
(d) generating and injecting the bubbles into the injection line;
(e) allowing the bubbles and contaminated water to mix in the injection line to form an inlet fluid;
(f) injecting the inlet fluid into the first chamber at an inlet adjacent the inlet weir;
(g) allowing the inlet fluid to pass over the inlet weir;
(h) allowing cleaned water and a remaining mixture of immiscible fluid and gas bubbles to separate from each other;
(i) allowing the cleaned water to flow downwardly by gravity to a plurality of parallel vertical riser conduits formed into the dividing wall between the chambers;
(j) transferring the cleaned water to the next chamber by flow through the plurality of parallel vertical conduits,
(k) injecting a controlled rate of a second bubble stream into each of the parallel vertical conduits,
(l) allowing the effluent streams from the plurality of parallel vertical conduits in fluid communication with the first chamber to enter a second chamber substantially identical to the first chamber,
(m) allowing the accumulated mixture of immiscible fluid in each chamber to float atop the aqueous phase and cascade over the immiscible fluid weir;
(n) allowing the accumulated immiscible fluid in each chamber to collect in a trough within the at least one chamber and flow out an immiscible fluid outlet,
(o) repeating steps (a) through (n) sufficient times through additional chambers in series to the first two chambers until the immiscible contaminants have been satisfactorily removed.

* * * * *